United States Patent
Hansen

(10) Patent No.: US 6,619,120 B2
(45) Date of Patent: Sep. 16, 2003

(54) WHEEL MOUNTING MEMBER FOR VEHICLE WHEEL BALANCER

(76) Inventor: Allan H. Hansen, 19126 Double Eagle Dr., Cornelius, NC (US) 28031

( * ) Notice: Subject to any disclaimer, the term of this patent is extended or adjusted under 35 U.S.C. 154(b) by 0 days.

(21) Appl. No.: 09/972,080

(22) Filed: Oct. 5, 2001

(65) Prior Publication Data

US 2003/0051548 A1 Mar. 20, 2003

Related U.S. Application Data

(60) Provisional application No. 60/323,487, filed on Sep. 19, 2001.

(51) Int. Cl.[7] .............................. G01M 1/02; G01M 1/06
(52) U.S. Cl. ............................... 73/487; 73/459; 73/460
(58) Field of Search ........................ 73/487, 460, 462, 73/66, 480, 459

(56) References Cited

U.S. PATENT DOCUMENTS

| | | | | |
|---|---|---|---|---|
| 3,667,299 A | * | 6/1972 | Roberts ........................ | 73/487 |
| 3,889,542 A | * | 6/1975 | Carrigan ...................... | 73/487 |
| 4,332,169 A | | 6/1982 | Stuart | |
| 4,433,578 A | * | 2/1984 | Hil .............................. | 73/487 |
| 4,462,253 A | * | 7/1984 | Becher ........................ | 73/487 |
| 4,478,081 A | * | 10/1984 | Greene ........................ | 73/487 |
| 5,948,980 A | | 9/1999 | Rossteuscher | |
| 5,987,761 A | | 11/1999 | Ohnesorge | |
| 6,338,273 B1 | * | 1/2002 | Warkotsch ................... | 73/487 |
| 6,481,281 B1 | * | 11/2002 | Gerdes ........................ | 73/487 |

* cited by examiner

Primary Examiner—Helen Kwok
(74) Attorney, Agent, or Firm—Schwartz Law Firm, P.C.

(57) ABSTRACT

A wheel mounting member is adapted for use in a vehicle wheel balancer to secure a vehicle wheel in a centered position relative to a centering shaft of the wheel balancer during wheel-balancing rotation of the wheel. The mounting member includes a base constructed of a polymeric material, and defining a center hole for receiving the centering shaft of the wheel balancer. A plurality of elongated wheel-engaging centering studs depend from the base, and are adapted for engaging the vehicle wheel to mount the wheel on the balancer.

20 Claims, 10 Drawing Sheets

WHEEL MOUNTING MEMBER FOR VEHICLE WHEEL BALANCER

This patent application claims priority to U.S. Provisional Patent Application Ser. No. 60/323,487, filed on Sep. 19, 2001.

TECHNICAL FIELD AND BACKGROUND OF THE INVENTION

This application relates to a wheel mounting member for a vehicle wheel balancer. The invention cooperates with a standard threaded wingnut or "quicknut" to torque the vehicle wheel to the balancer. In order to obtain accurate balancing results, the wheel must remain precisely centered during operation of the wheel balancer. Upon rotation of the wheel, conventional electronic sensors and circuitry acquire data indicating the appropriate placement of balancing weights on the wheel. Proper wheel balancing is essential to achieving a smooth, vibration-free drive.

Conventional wheel mounting members include an annular flange plate with generally 3–8 removable wheel-engaging studs. The studs locate within the lug holes of the wheel, and can be arranged to match the particular lug hole pattern of the wheel being balanced. Upon tightening the wingnut on the balancer shaft, the studs cooperate to uniformly torque the wheel to the balancer. Such mounting members have been used in the wheel balancing industry for over 20 years, and are designed to serve two main purposes; first, to center the wheel on the balancer shaft to achieve optimal "static" balancing, and second, to torque the wheel to the balancer to achieve optimal "dynamic" balancing. While such mounting members are capable of both static and dynamic balancing, more accurate balancing results are generally achieved when using the mounting member in conjunction with a medium to high-angle standard centering cone. The centering cone fits within the center hole of the wheel opposite the mounting member, and is intended to pre-center or "lift" the wheel as the mounting member torques the wheel to balancer. Using a standard cone to pre-center the wheel, the mounting member is intended to achieve final wheel centering and torque.

In the past, most wheels were made of steel and did not have machined and accurate center holes. Traditional mounting members were designed to account for this inaccuracy. By using a medium to high angle cone at the center hole of the wheel, as the mounting member was urged against the wheel, it cooperated with the cone to lift and center the wheel on the balancer shaft. Cones with higher angles were used on wheels with less accurate center holes so that the mounting member served to do as much of the final static centering as possible.

To achieve precise accuracy, the flange plate of the mounting member has traditionally been produced of expensive drop forged tool steel which is hardened and ground. Each of the removable studs is likewise hardened and ground. The openings in the flange plate which receive the studs are traditionally honed to achieve an exact fit. Any compromise in this design would make the mounting member less accurate and shorten its useful life. While this mounting member works extremely well for centering and torque, because of its high tolerances and precise design, it is considerably expensive to produce and replace.

Since virtually all modern wheels have machined and accurate center holes, a very low angle or even cylindrical cone generally fits the wheels best and produces the best static balancing results without help from the mounting member. In other words, the wheel mounting member is no longer needed to achieve final static centering in wheels with highly accurate center holes. Its function in achieving proper dynamic balancing, however, is still essential. The invention, therefore, is an improved mounting member intended to torque, or dynamically balance, the vehicle wheel on the balancer without expensive design considerations necessary to achieve both static and dynamic balancing. The invention can be made of material other than steel, such as machined or injection molded plastic or other composite material.

SUMMARY OF INVENTION

Therefore, it is an object of the invention to provide an improved mounting member for a vehicle wheel balancer which serves to dynamically balance the vehicle wheel on the centering shaft of the balancer.

It is another object of the invention to provide a wheel mounting member which cooperates with a low angle centering sleeve to achieve precisely accurate static and dynamic balancing of the wheel on the centering shaft of the balancer.

It is another object of the invention to provide a wheel mounting member which cooperates with a wingnut to sufficiently torque the vehicle wheel onto the centering shaft such that the low angle sleeve achieves precise static centering.

It is another object of the invention to provide a wheel mounting member which has slight inherent flexibility.

It is another object of the invention to provide a wheel mounting member which will not scratch or otherwise damage the vehicle wheel.

It is another object of the invention to provide a wheel mounting member which is relatively lightweight and inexpensive to manufacture.

It is another object of the invention to provide a wheel mounting member which does not rely on high tolerances to produce accurate balancing results.

It is another object of the invention to provide a wheel mounting member which will not damage or create wear on the balancer shaft.

It is another object of the invention to provide a wheel mounting member which reduces the time and energy required to mount the vehicle wheel on the balancer.

It is another object of the invention to provide a wheel mounting member which is relatively easy to handle.

It is another object of the invention to provide a wheel mounting member which is durable.

It is another object of the invention to provide a wheel mounting member which includes a plastic centering stud having sufficient natural flex to ensure that virtually all static centering is achieved by a separate centering sleeve or low angle cone.

It is another object of the invention to provide a wheel mounting member which includes a plastic flange plate reinforced with an inexpensive metal in order to prevent flexing. Flexing in the plate would reduce the adaptors ability to apply the same amount of torque to each centering stud.

These and other objects of the present invention are achieved in the preferred embodiments disclosed below by providing a wheel mounting member adapted for use in a vehicle wheel balancer to secure a vehicle wheel in a centered position relative to a centering shaft of the wheel balancer during wheel-balancing rotation of the wheel. The mounting member includes a base constructed of a polymeric material, and defining a center hole for receiving the centering shaft of the wheel balancer. A plurality of elongated wheel-engaging centering studs depend from the base and are adapted for engaging the vehicle wheel to mount the wheel on the balancer.

According to another preferred embodiment of the invention, the base has an annular flange.

According to another preferred embodiment of the invention, the centering stud is compressible along its longitudinal axis.

According to another preferred embodiment of the invention, the centering stud has an elongated stud shaft, and a head formed at a free end of the stud shaft and adapted for engaging the vehicle wheel.

According to another preferred embodiment of the invention, the head of the centering stud includes a reduced-diameter locating tip for locating the stud in a lug hole of the vehicle wheel.

According to another preferred embodiment of the invention, the base includes a reinforcing metal plate molded within the polymeric material.

According to another preferred embodiment of the invention, the centering stud includes a reinforcing metal rod molded within a polymeric material.

According to another preferred embodiment of the invention, the centering stud has a reinforcing metal tip including an anchor molded within a polymeric material.

In another embodiment, the invention is a vehicle wheel balancer for obtaining data relative to the imbalance of a vehicle wheel. The wheel balancer includes a centering shaft having a free end adapted for extending through a center hole of the wheel, and a proximal end opposite the free end. Means are provided for rotating the centering shaft. A locating hub is carried on the shaft and adapted for engaging a first side of the wheel to locate the wheel on the balancer. A centering sleeve is carried on the shaft adjacent the locating hub, and is adapted for extending through the center hole of the wheel from its first side to center the wheel relative to the shaft. A mounting member includes a base formed of a polymeric material, and defining a center hole for receiving the centering shaft of the wheel balancer. A plurality of elongated wheel-engaging centering studs depend from the base, and are adapted for engaging the vehicle wheel to mount the wheel on the balancer. The wheel is sandwiched between the centering studs and the locating hub such that the mounting member, locating hub, and centering sleeve cooperate to secure the wheel in a centered position relative to the shaft during wheel-balancing rotation of the wheel.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND THE BEST MODE

Figure 1:
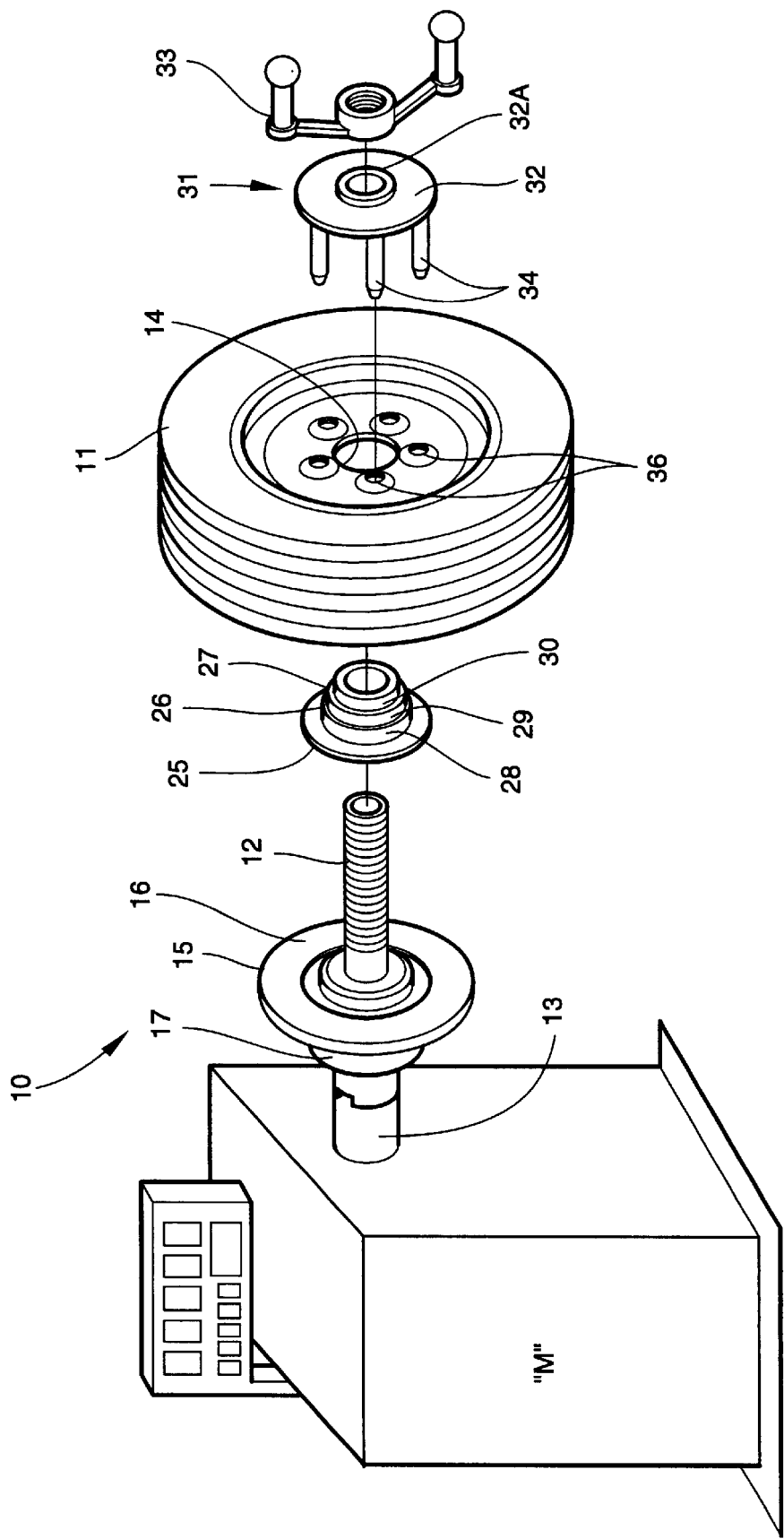
FIG. 1 is a perspective view of a vehicle wheel balancer according to one preferred embodiment of the invention with certain components of the wheel balancer pulled away to demonstrate their assembly on the centering shaft.

Referring now specifically to the drawings, a vehicle wheel balancer according to the present invention is illustrated in FIG. 1, and shown generally at reference numeral 10. The wheel balancer 10 is adapted for determining the location and degree of imbalance of a vehicle wheel 11 prior to mounting the wheel 11 on a vehicle.

Figure 2:
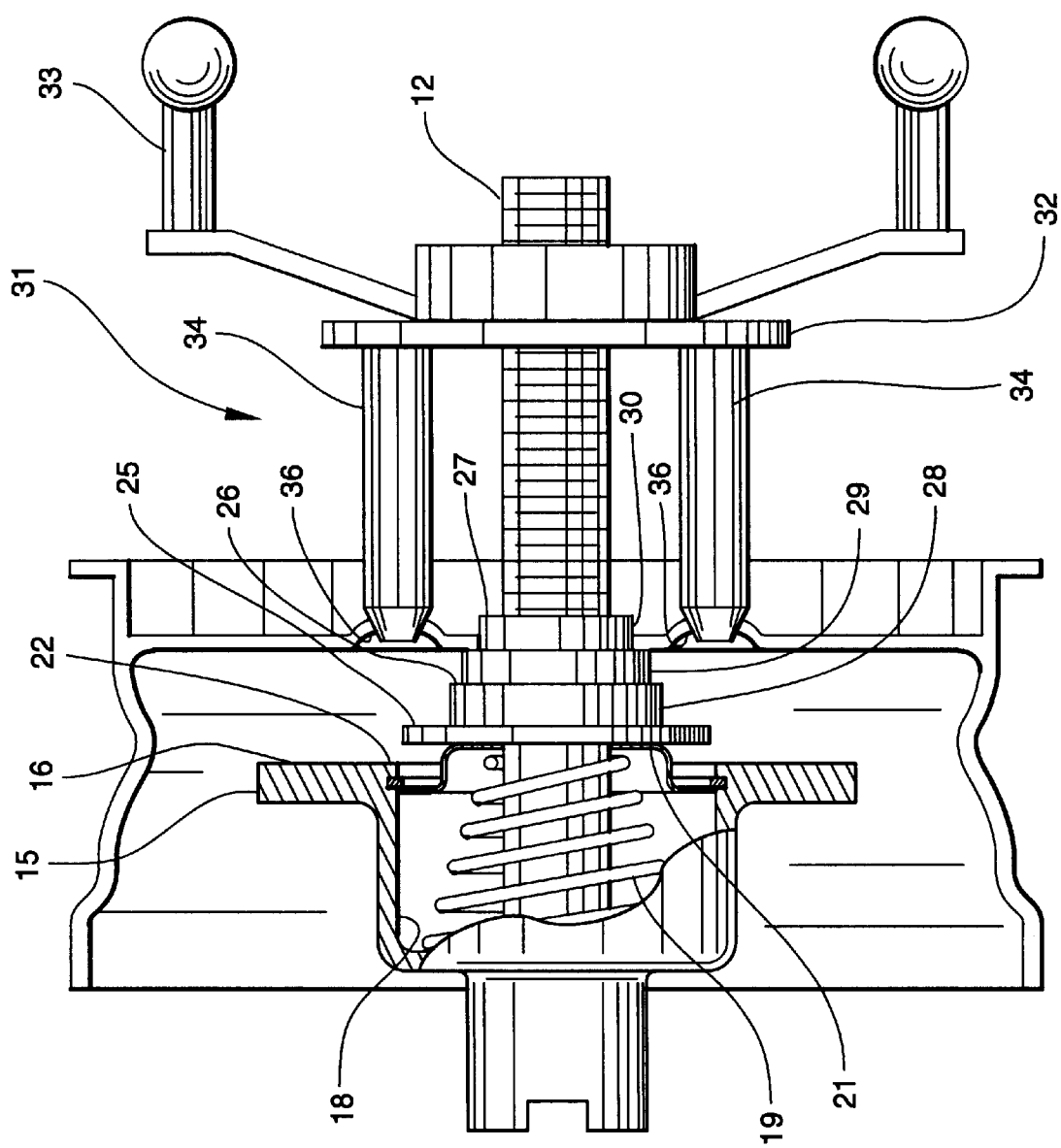
FIG. 2 is a cross-sectional view of the wheel centering assembly, and showing the position of the vehicle wheel prior to torquing the wheel onto the balancer.
Figure 3:
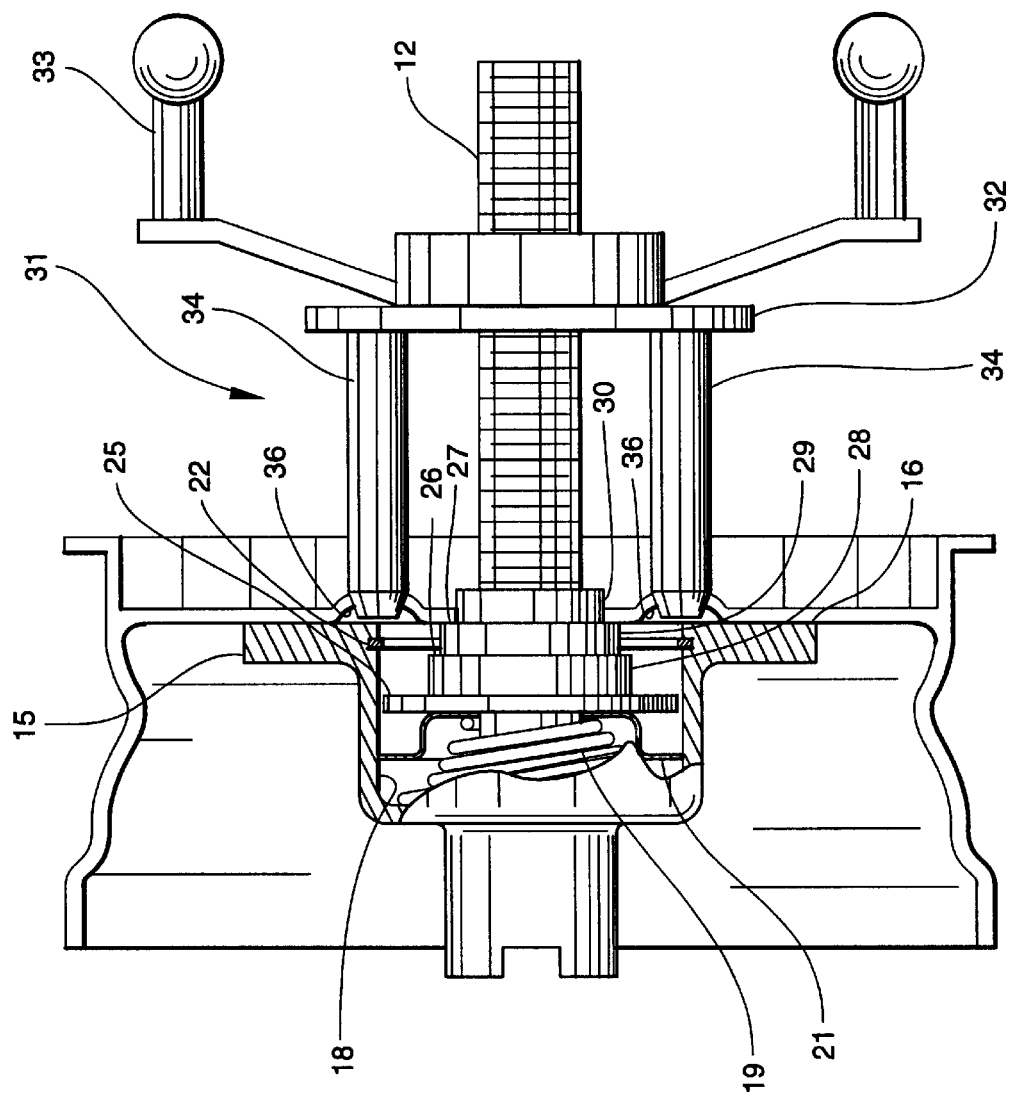
FIG. 3 is a cross-sectional view of the wheel centering assembly with the vehicle wheel torqued onto the balancer.

Referring to FIGS. 1, 2, and 3, the vehicle wheel 11 is carried on a rotatable centering shaft 12 having a proximal end operatively coupled to a drive shaft 13 of the balancer motor "M", and a threaded free end adapted for extending through a center hole 14 of the wheel 11. A locating hub 15 is mounted on the centering shaft 12, and includes an annular face plate 16 and integrally-formed cup 17. The cup 17 defines an internal cavity 18 containing a conical spring 19 and floating spring cover 21. The spring cover 21 is adapted to float within the cavity 18 when pushed against the biasing force of the spring 19. An annular retaining flange 22 located at the mouth of the cavity 18 adjacent the face plate 16 retains the spring cover 21 inside the cavity 18. An exchangeable centering sleeve 25 resides between the vehicle wheel 11 and locating hub 15 to pre-center the wheel 11 relative to a rotational axis defined by the centering shaft 12. Preferably, the sleeve 25 has a number of steps 26 and 27 which form respective low-angle cone portions 28, 29, 30 of different sizes. The vehicle wheel 11 engages the appropriate cone portion 28, 29, 30 at the center hole 14, as shown in FIGS. 2 and 3, and is torqued onto the balancer 10 by a mounting member 31 and internally-threaded wing nut 33.

Figure 4:
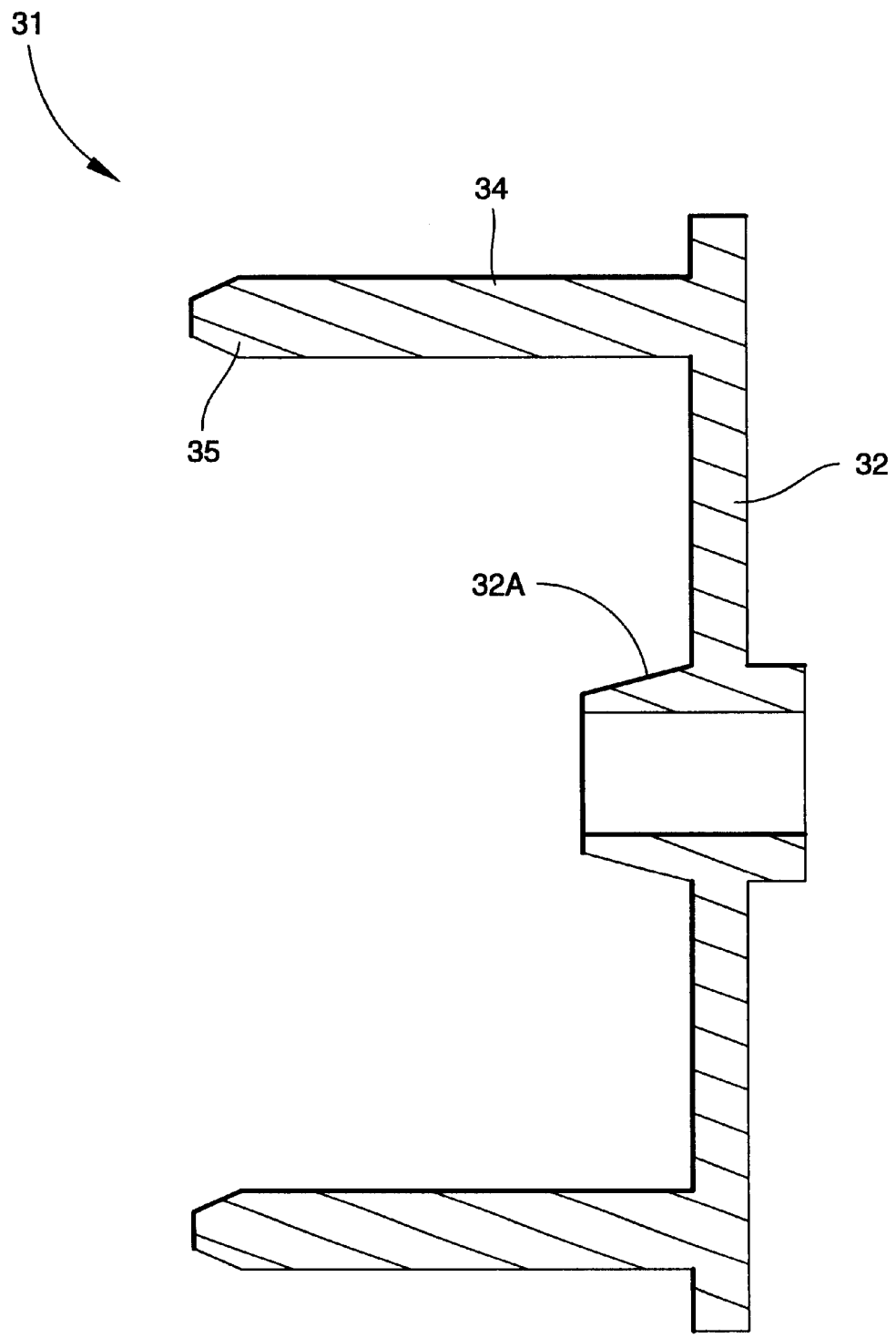
FIG. 4 is a cross-sectional view of a mounting member formed of a molded polymeric material.

The mounting member 31 is preferably molded of a polymeric material, such as ABS, PVC, polycarbonate, nylon, or other suitable polymer plastic. The polymeric material may include additives such as plasticizers, autooxidants, colorants, fillers, stabilizers, and reinforcements. As best shown in FIG. 4, the mounting member 31 includes an annular base plate 32 defining a center hole for receiving the centering shaft 12, a mounting collar 32A formed at the mouth of the center hole, and a number of integrally-formed elongated centering studs 34. Each centering stud 34 has a head 35 and a reduced-diameter locating tip 35A adapted for engaging the wheel 11 at the lug holes 36. The diameter of the head 35 is sufficiently large to prevent penetration of the centering stud 34 through the wheel 11. As the wingnut 33 is tightened along the threaded centering shaft 12, the centering studs 34 of the mounting member 31 force the wheel 11 into a centered position against the annular face plate 16 of the locating hub 15, as shown in FIG. 3. The centering studs 34 are arranged to simultaneously apply the same torque at each lug hole 36 formed with the vehicle wheel 11.

Once the wheel 11 is properly mounted, centered, and torqued, as described above, the balancer motor "M" is activated to rotate the drive shaft 13 causing rotation of the centering shaft 12 and wheel 11. During operation of the balancer 10, conventional electronic sensors and circuitry acquire data indicating the appropriate placement of balancing weights on the wheel 11. The wheel 11 preferably rotates at speeds between 50–300 rpm. When balancing is completed, the wingnut 33 and mounting member 31 are removed from the balancer 10 and the wheel 11 removed from the centering shaft 12. Alternatively, the wheel balancer 10 does not include an electric motor "M". In this embodiment, the wheel 11 is manually rotated to acquire the necessary balancing data.

Alterative Embodiments of Wheel Mounting Member

FIGS. 5–10 illustrate alternative embodiments of the wheel mounting member used to torque and center the vehicle wheel 11 on the balancer 10. Further additional embodiments (not shown) may include other combinations of the features described below.

Figure 5:
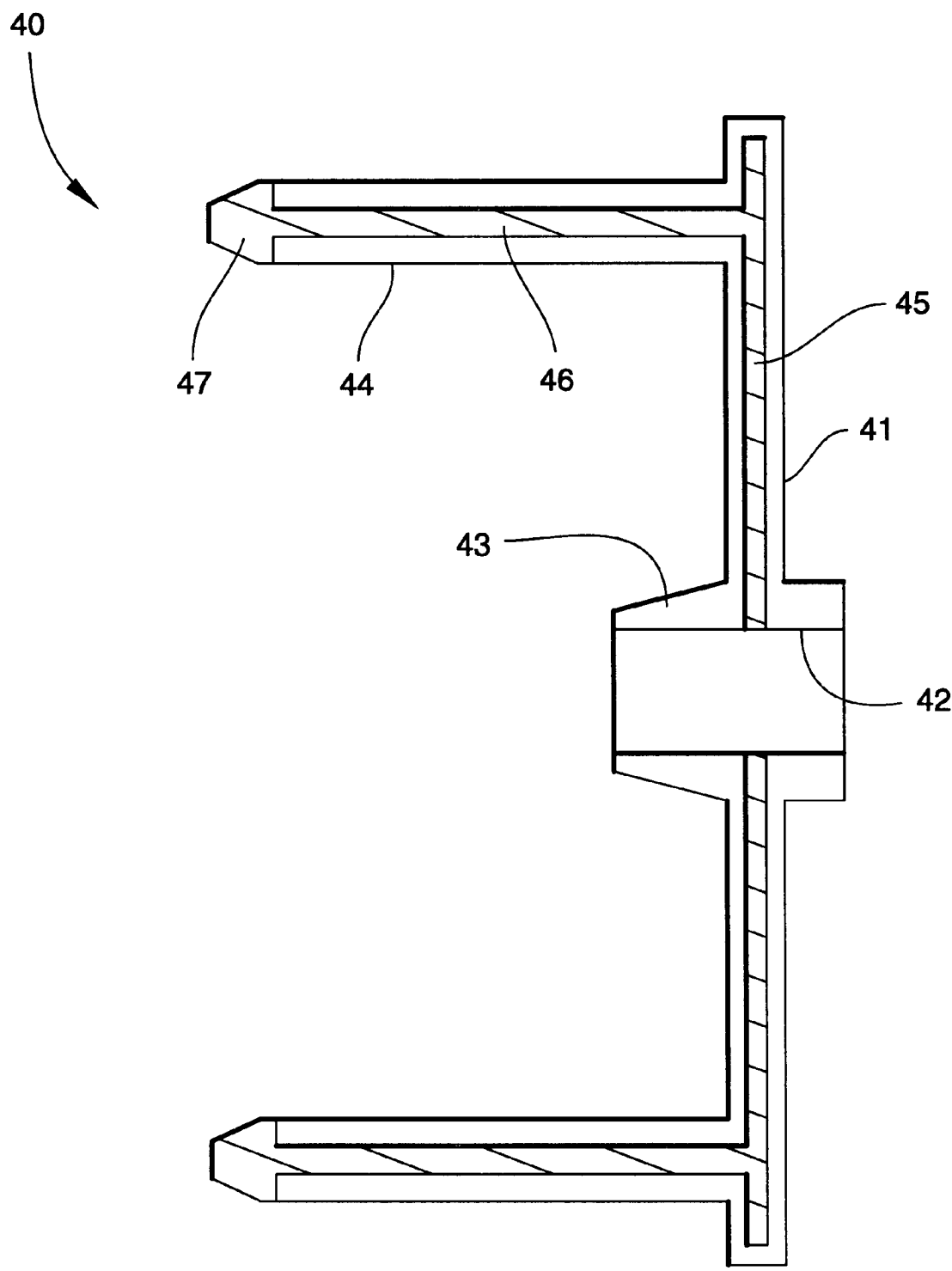
FIG. 5 is a cross-sectional view of a mounting member according to a second preferred embodiment of the invention, and including metal reinforcing elements in the base plate and centering studs.

Referring to FIG. 5, the mounting member 40 includes an annular base plate 41 defining a center opening 42 adapted for receiving the centering shaft of the wheel balancer, as previously described, a mounting collar 43 formed at the mouth of the opening 42, and a number of elongated wheel-engaging centering studs 44. The base plate 41 is formed of a polymeric material molded around an annular metal reinforcing plate 45. The centering studs 44 are integrally formed with the base plate 41, and include respective metal reinforcing rods 46 molded within the polymeric material and metal heads 47 permanently joined to the rods 46. The reinforcing rods 46 of the centering studs are preferably welded to the reinforcing plate 45 prior to molding.

Figure 6:
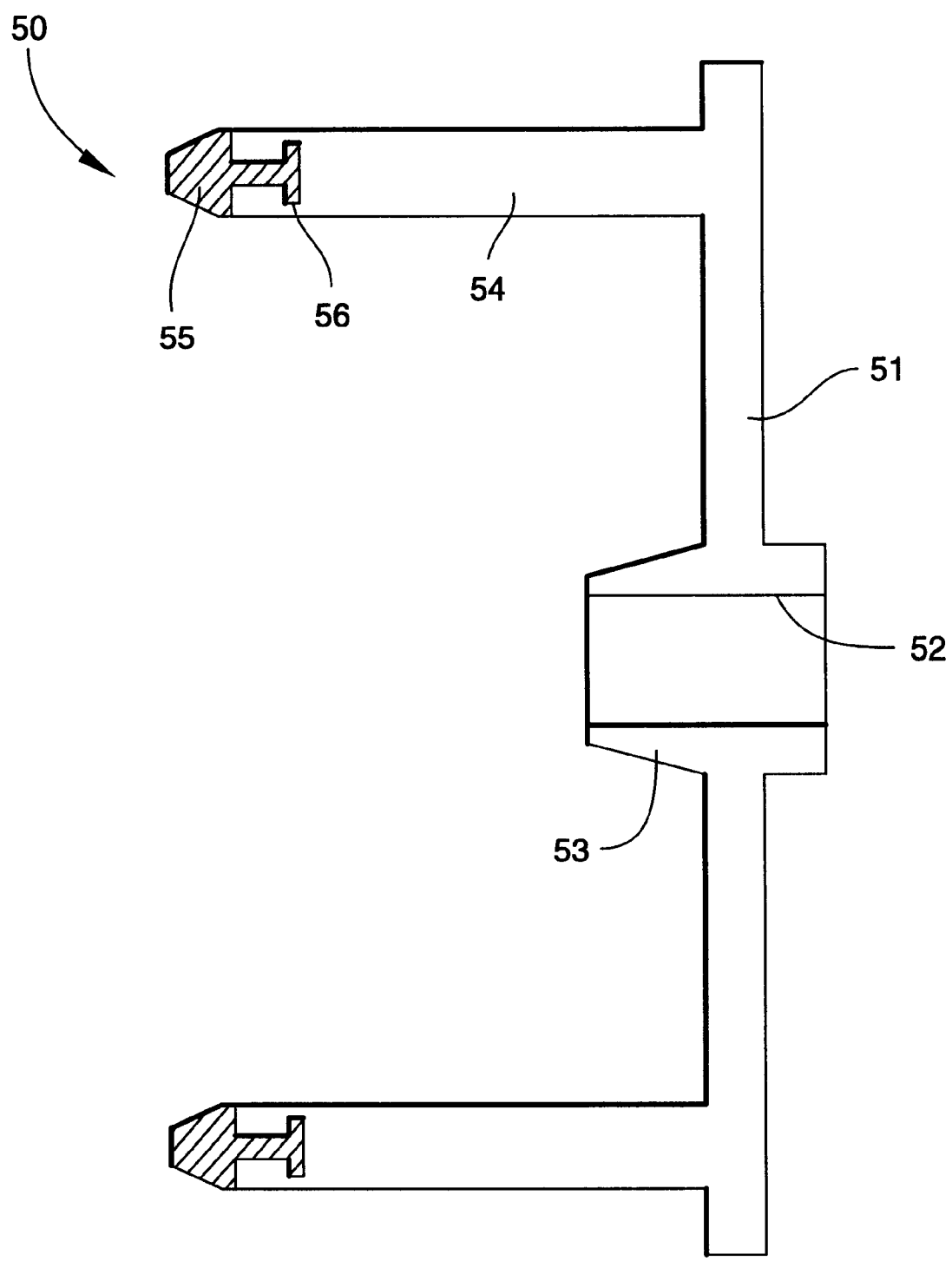
FIG. 6 is a cross-sectional view of a mounting member according to a third preferred embodiment of the invention, and including a metal reinforcing element in the head of the centering stud.

A further embodiment of a mounting member 50 is shown in FIG. 6. The mounting member 50 includes an annular base plate 51 defining a center opening 52 adapted for receiving the centering shaft of the wheel balancer, a mounting collar 53 formed at the mouth of the opening 52, and a number of elongated wheel-engaging centering studs 54. The base plate 51 and centering studs 54 are integrally formed together of a molded polymeric material. The centering studs 54 include respective metal reinforcing heads 55 with anchors 56 projecting into the molded shaft of the stud.

Figure 7:
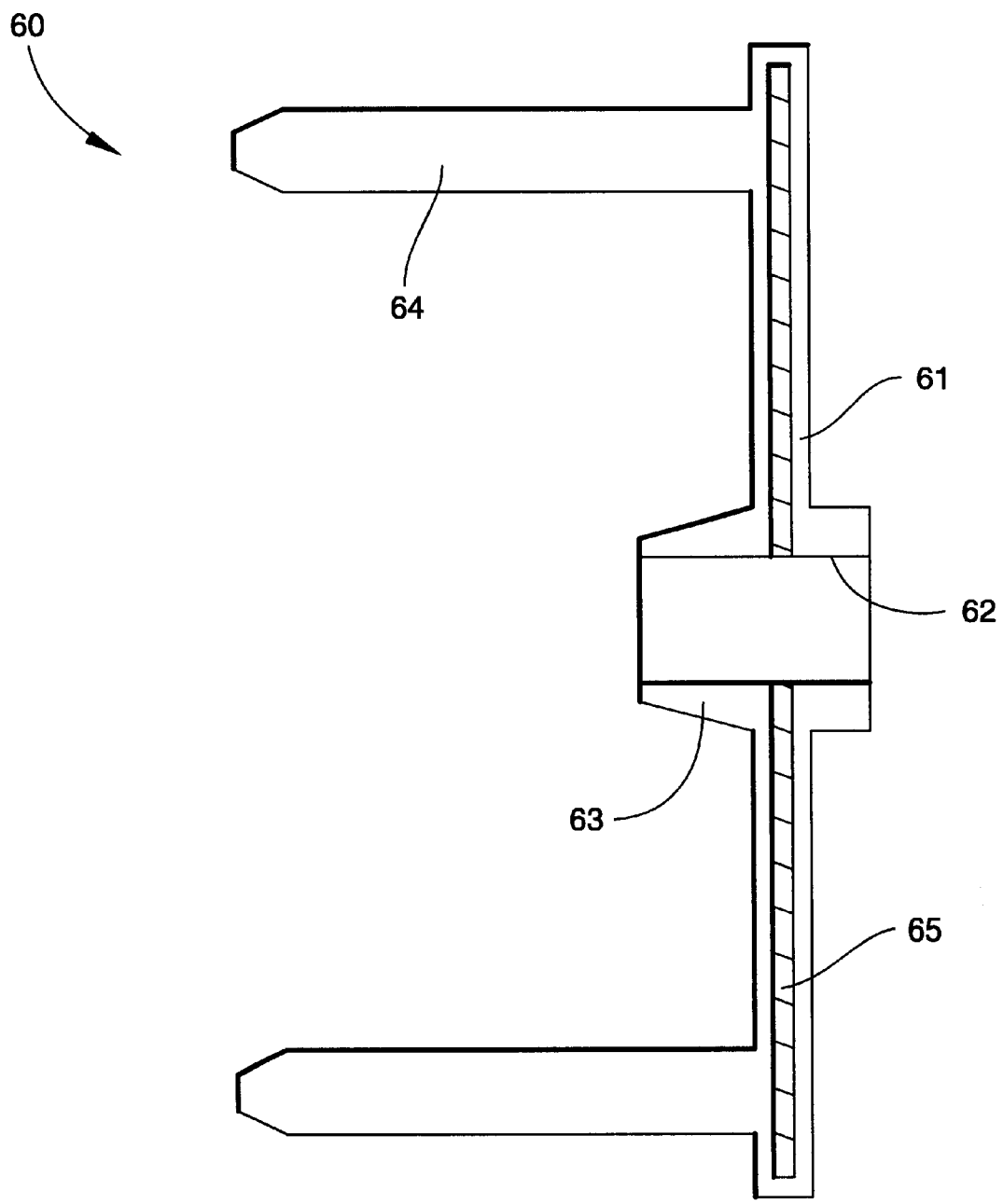
FIG. 7 is a cross-sectional view of a mounting member according to a fourth preferred embodiment of the invention, and including a metal reinforcing element in the base plate of the mounting member.

FIG. 7 illustrates yet another embodiment of a mounting member 60. The mounting member 60 includes an annular base plate 61 defining a center opening 62 adapted for receiving the centering shaft of the wheel balancer, a mounting collar 63 formed at the mouth of the opening 62, and a number of elongated wheel-engaging centering studs 64. The base plate 61 is formed of a polymeric material molded around an annular metal reinforcing plate 65. The centering studs 64 are formed of a molded polymeric material integrally formed with the base plate 61.

Figure 8:
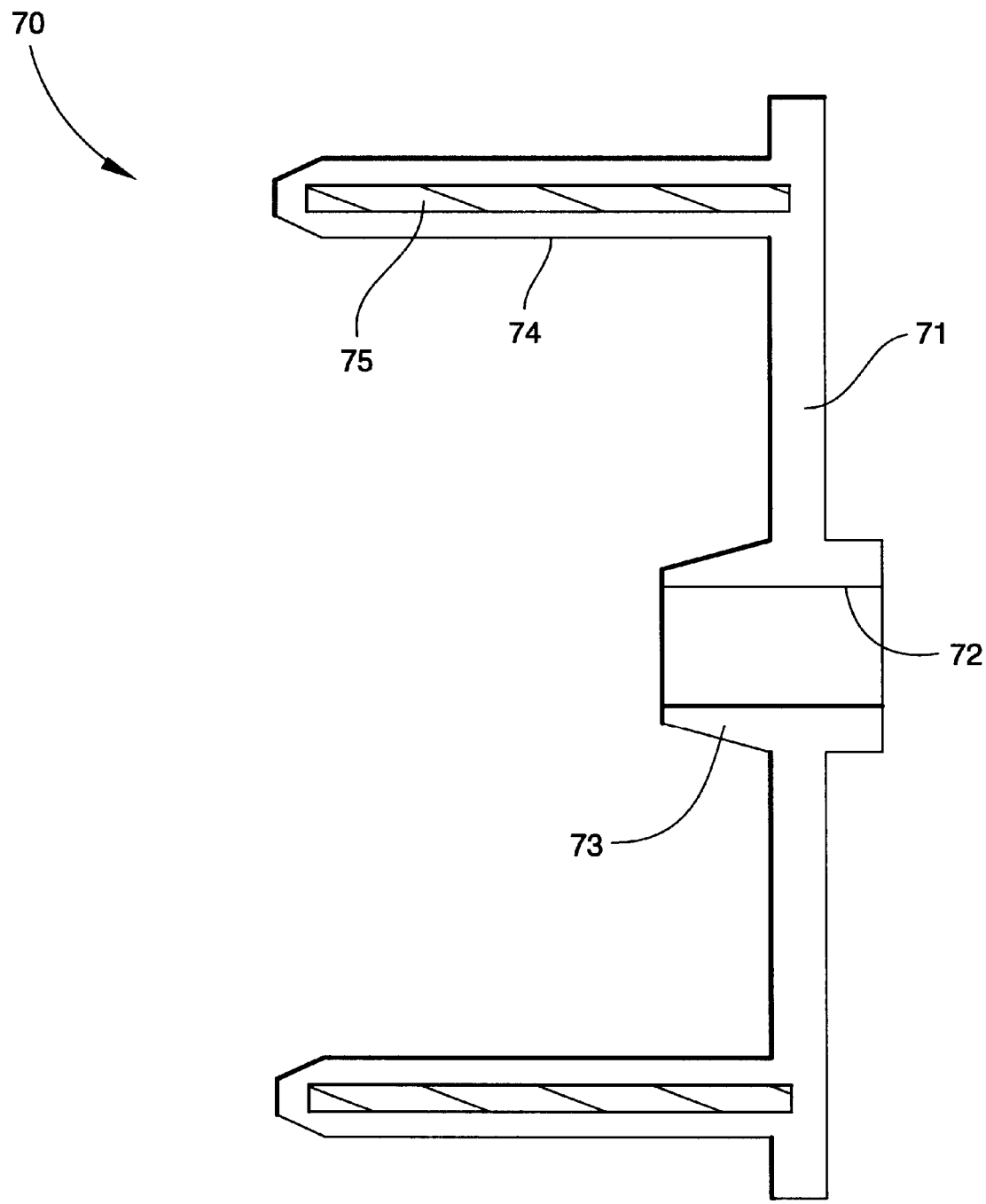
FIG. 8 is a cross-sectional view of a mounting member according to a fifth preferred embodiment of the invention, and including a metal reinforcing element in the centering stud of the mounting member.

FIG. 8 illustrates yet another embodiment of a mounting member 70. The mounting member 70 includes an annular base plate 71 defining a center opening 72 adapted for receiving the centering shaft of the wheel balancer, a mounting collar 73 formed at the mouth of the opening 72, and a number of elongated wheel-engaging centering studs 74. The base plate 71 is formed of a molded polymeric material. The centering studs 74 are integrally formed with the base plate 71, and include respective reinforcing rods 75 molded within the polymeric material.

Figure 9:
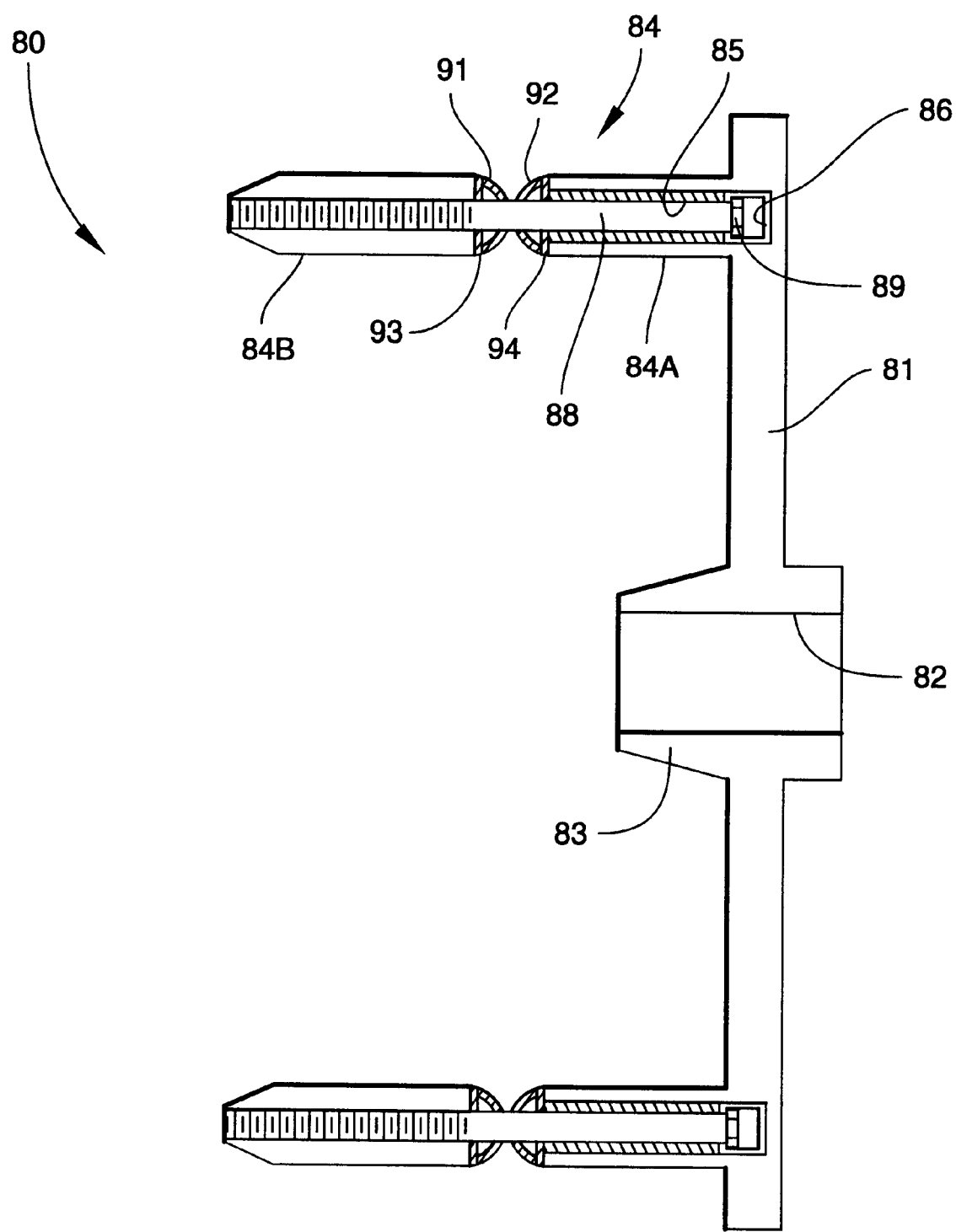
FIG. 9 is a cross-sectional view of a mounting member according to a sixth preferred embodiment of the invention, and including compressible centering studs shown in a relaxed extended condition.
Figure 10:
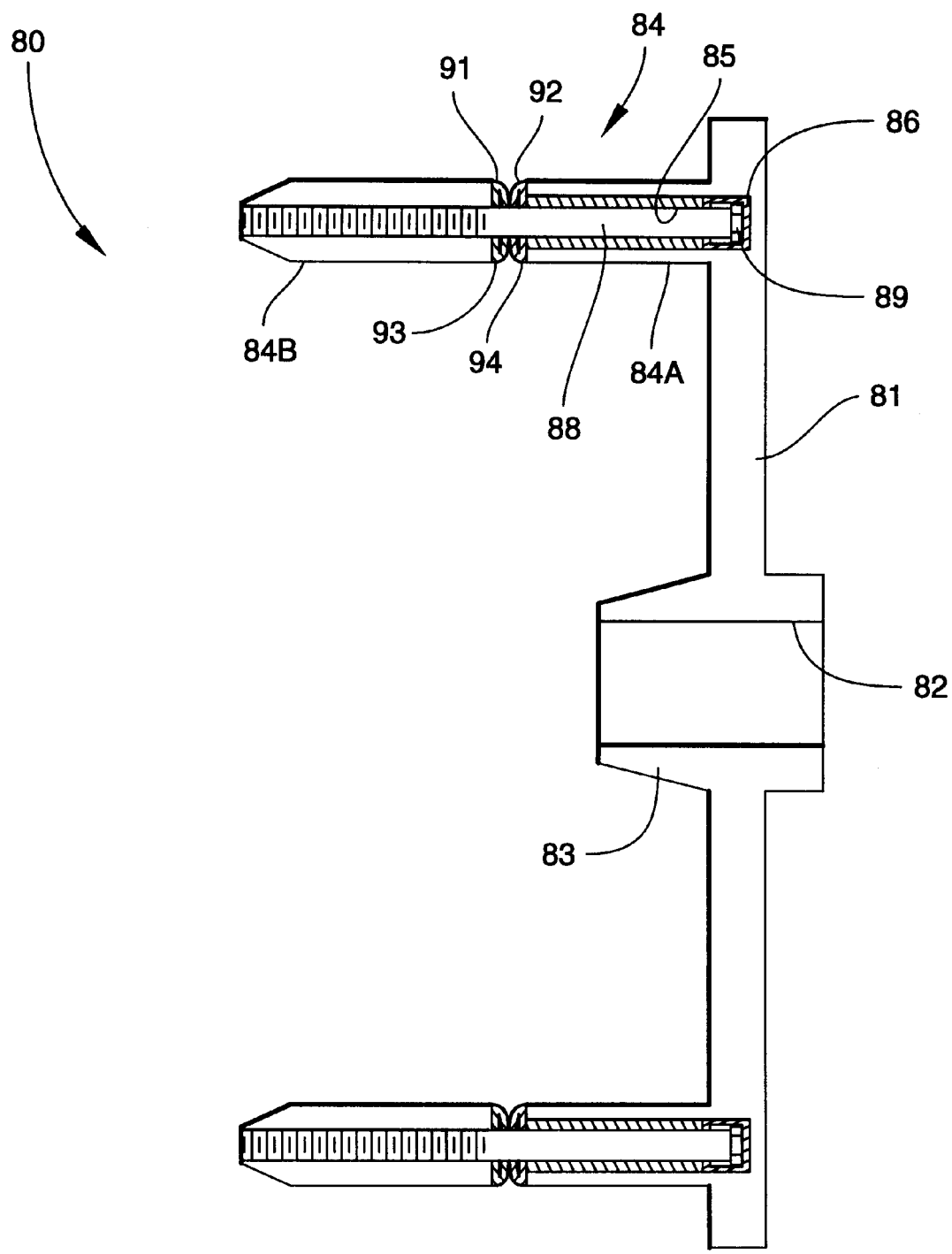
FIG. 10 is a cross-sectional view of the mounting member shown in FIG. 9 with the compressible centering studs in a compressed condition.

A final embodiment of a mounting member 80 is illustrated in FIGS. 9 and 10. The mounting member 80 includes an annular base plate 81 defining a center opening 82 adapted for receiving the centering shaft of the wheel balancer, a mounting collar 83 formed at the mouth of the opening 82, and a number of elongated wheel-engaging centering studs 84. The base plate 81 is formed of a molded polymeric material. The centering studs 84 are formed in respective adjacent sections 84A and 84B. Section 84A is integrally molded with the base plate 81, and includes an internal sleeve 85 and cap 86 for accommodating sliding movement of a reinforcing bolt 88. The cap 86 has an inwardly turned annular shoulder which engages the bolt head 89 to retain the bolt 88 within the stud section 84A. The adjacent stud section 84B is molded to a threaded free end of the reinforcing bolt 88. A pair of spring washers 91 and 92 are located between the stud sections 84A and 84B, and a pair of flat washers 93 and 94. The spring washers 91 and 92 cooperate to allow longitudinal compression of the centering stud 84 when the mounting member 80 is urged against the vehicle wheel, as previously described. As shown in FIG. 10, when compressed, the reinforcing bolt 88 slides within sleeve 85 of the stud section 84A towards the base plate 81 of the mounting member 80. The spring washers 91 and 92 flatten out as the stud section 84B is forced against the stud section 84A. When pressure against the centering studs 84 is removed, the spring washers 91 and 92 return to their relaxed position shown in FIG. 9.

In any of the embodiments described above, the centering studs may be separately molded and may include respective connecting ends adapted for being removably inserted into small stud-receiving openings formed in the base plate.

A wheel mounting member for a vehicle wheel balancer is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A wheel mounting member adapted for use in a side-load vehicle wheel balancer including a centering shaft carrying a vehicle wheel for balancing, said wheel mounting member adapted for cooperating with a centering sleeve on opposite sides of the vehicle wheel to secure the vehicle wheel in a statically and dynamically centered position relative to the centering shaft of the wheel balancer during wheel-balancing rotation of the wheel, said mounting member comprising:

(a) a base comprising a polymeric material and defining a center hole for receiving the centering shaft of the wheel balancer; and (b) a plurality of elongated wheel-engaging centering studs each comprising a polymeric material and depending from said base to engage the vehicle wheel, such that when said wheel mounting member is applied to the centering shaft of the wheel balancer and urged against the vehicle wheel, said wheel mounting member achieves dynamic wheel balancing while static wheel balancing is achieved by the centering sleeve.

2. A wheel mounting member according to claim 1, wherein said base comprises an annular flange.

3. A wheel mounting member according to claim 1, wherein each of said centering studs is compressible along a longitudinal axis thereof.

4. A wheel mounting member according to claim 1, wherein each of said centering studs comprises an elongated stud shaft, and a head formed at a free end of said stud shaft and adapted for engaging the vehicle wheel.

5. A wheel mounting member according to claim 4, wherein the head of each of said centering studs comprises a reduced-diameter locating tip for locating said stud in a lug hole of the vehicle wheel.

6. A wheel mounting member according to claim 1, wherein said base comprises a reinforcing metal plate molded within said polymeric material.

7. A wheel mounting member according to claim 1, wherein each of said centering studs comprises a reinforcing metal rod molded within a polymeric material.

8. A wheel mounting member according to claim 1, wherein each of said centering studs comprises a reinforcing metal tip including an anchor molded within a polymeric material.

9. A wheel mounting member formed of a polymeric material and adapted for use in a side-load vehicle wheel balancer including a centering shaft carrying a vehicle wheel for balancing, said wheel mounting member adapted for cooperating with a centering sleeve on opposite sides of the vehicle wheel to secure the vehicle wheel in a statically and dynamically centered position relative to the centering shaft of the wheel balancer during wheel-balancing rotation of the wheel, said mounting member comprising:

(a) a base comprising a polymeric material and defining a center hole for receiving the centering shaft of the wheel balancer; and (b) a plurality of elongated wheel-engaging centering studs each comprising a polymeric material and integrally formed with said base to engage the vehicle wheel, such that when said wheel mounting member is applied to the centering shaft of the wheel balancer and urged against the vehicle wheel, said wheel mounting member achieves dynamic wheel balancing while static wheel balancing is achieved by the centering sleeve.

10. A wheel mounting member according to claim 9, wherein said base comprises an annular flange.

11. A wheel mounting member according to claim 9, wherein each of said centering studs comprises an elongated stud shaft, and a head formed at a free end of said stud shaft and adapted for engaging the vehicle wheel.

12. A wheel mounting member according to claim 11, wherein the head of each of said centering studs comprises a reduced-diameter locating tip for locating said stud in a lug hole of the vehicle wheel.

13. A side-load vehicle wheel balancer for obtaining data relative to the imbalance of a vehicle wheel, said wheel balancer comprising:

(a) a centering shaft having a free end adapted for extending through a center hole of the wheel, and a proximal end opposite the free end;

(b) means for rotating said centering shaft;

(c) a locating hub carried on said shaft and adapted for engaging a first side of the wheel to locate the wheel on said balancer;

(d) a centering sleeve carried on said shaft adjacent said locating hub, and adapted for extending through the center hole of the wheel from the first side thereof to center the wheel relative to said shaft; and (e) a mounting member including a base defining a center hole for receiving the centering shaft of the wheel balancer, and a plurality of elongated wheel-engaging centering studs each comprising a polymeric material and depending from said base to engage the vehicle wheel such that when said mounting member is applied to said centering shaft of said wheel balancer and urged against the vehicle wheel, said mounting member achieves dynamic wheel balancing while static wheel balancing is achieved by said centering sleeve.

14. A vehicle wheel balancer according to claim 13, wherein the base of said mounting member comprises an annular flange.

15. A vehicle wheel balancer according to claim 13, wherein the centering studs of said mounting member are compressible.

16. A vehicle wheel balancer according to claim 13, wherein each of said centering studs comprises an elongated stud shaft, and a head formed at a free end of said stud shaft and adapted for engaging the vehicle wheel.

17. A vehicle wheel balancer according to claim 16, wherein the head of each of said centering studs comprises a reduced-diameter locating tip for locating said stud in a lug hole of the vehicle wheel.

18. A wheel mounting member according to claim 13, wherein the base of said mounting member comprises a reinforcing metal plate molded within said polymeric material.

19. A wheel mounting member according to claim 13, wherein each of said centering studs comprises a reinforcing metal rod molded within a polymeric material.

20. A wheel mounting member according to claim 13, wherein each of said centering studs comprises a reinforcing metal tip including an anchor molded within a polymeric material.

* * * * *